US011383156B1

(12) United States Patent
Monroy-Hernández et al.

(10) Patent No.: US 11,383,156 B1
(45) Date of Patent: Jul. 12, 2022

(54) MULTI-USER AR EXPERIENCE WITH OFFLINE SYNCHRONIZATION

(71) Applicants: Andrés Monroy-Hernández, Seattle, WA (US); Ava Robinson, Solana Beach, CA (US); Yu Jiang Tham, Seattle, WA (US); Rajan Vaish, Beverly Hills, CA (US)

(72) Inventors: Andrés Monroy-Hernández, Seattle, WA (US); Ava Robinson, Solana Beach, CA (US); Yu Jiang Tham, Seattle, WA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 4 days.

(21) Appl. No.: 17/136,843

(22) Filed: Dec. 29, 2020

(51) Int. Cl.
*A63F 13/213* (2014.01)
*A63F 13/2145* (2014.01)

(52) U.S. Cl.
CPC ........ *A63F 13/213* (2014.09); *A63F 13/2145* (2014.09)

(58) Field of Classification Search
CPC ............................ A63F 13/213; A63F 13/2145
See application file for complete search history.

(56) References Cited

U.S. PATENT DOCUMENTS

| 10,789,475 | B2* | 9/2020 | Yin | G06Q 30/0261 |
| 2006/0038833 | A1* | 2/2006 | Mallinson | H04N 1/00323 |
| | | | | 345/633 |
| 2019/0278997 | A1* | 9/2019 | Yin | G06K 7/1404 |
| 2020/0063315 | A1 | 2/2020 | Yoon | |
| 2021/0097714 | A1* | 4/2021 | Grundhoefer | G06K 7/1417 |

FOREIGN PATENT DOCUMENTS

JP    6535801 B1    6/2019

OTHER PUBLICATIONS

International Search Report and Written Opinion for International Application No. PCT/US2021/060339, dated Mar. 10, 2022 (Oct. 3, 2022)—10 pages.

* cited by examiner

*Primary Examiner* — Seng H Lim
(74) *Attorney, Agent, or Firm* — Culhane Meadows PLLC; Stephen J. Weed

(57) ABSTRACT

Systems, methods, and computer readable media directed to multi-user visual experiences such as interactive gaming experiences and artistic media experiences. A viewing electronic device includes a camera configured to capture images, a display, and a processor coupled to the camera and the display. The processor is configured to capture, with the camera, images of a rotating marker where the rotating marker is presented on a monitor of a remote device and to present, on the display, a visual experience where the visual experience has an adjustable feature. The processor detects a parameter of the rotating marker from the captured images that corresponds to the adjustable feature and updates the visual experience responsive to the detected parameter. The parameter may be one or more of an angle, speed of rotation, direction of rotation, color, or pattern of the rotating marker.

20 Claims, 18 Drawing Sheets

MULTI-USER AR EXPERIENCE WITH OFFLINE SYNCHRONIZATION

BACKGROUND

Mobile devices such a cellular telephones and tablet computers include user interfaces through which users can share and access programs, games, photos, or videos. In many cases, users of mobile devices seek out gaming applications, augmented reality (AR) applications, AR games, and other forms of media content for entertainment.

Social networking systems have millions of users each day. Each user in a social networking system can receive, access, and transmit AR games and applications between members within her individual social networking profile or to individuals outside of the social networking profile.

BRIEF DESCRIPTION OF THE SEVERAL VIEWS OF THE DRAWINGS

In the drawings, which are not necessarily drawn to scale, like numerals may describe similar components in different views. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Examples of systems, methods, and computer readable media directed to multi-user visual experiences such as interactive games and artistic media are described. Each user can simultaneously participate in a visual experience by capturing images of the same rotating marker with their respective viewing electronic devices without the need for a network connection. This enables users to participate in the visual experience together even though they are offline, thereby fostering in-person interactions and co-located experiences.

A viewing electronic device for use with the visual experiences includes a camera configured to capture images, a display, and a processor coupled to the camera and the display. The processor is configured to capture, with the camera, images of a rotating marker where the rotating marker is presented on a monitor of a remote device and present, on the display of the viewing electronic device, a visual experience where the visual experience has an adjustable feature. The processor detects a parameter of the rotating marker from the captured images that corresponds to the adjustable feature and updates the visual experience responsive to the detected parameter. The parameter may be an angle of rotation, a speed of rotation, a direction of rotation, color(s) of a region(s), pattern(s) of a region(s), or a combination thereof for the rotating marker.

In at least one example, a system is provided that generates the rotating marker that is rendered on the remote device (such as a laptop, personal computer, or television monitor) where multiple viewing electronic devices actively and simultaneously detect and capture the rotating marker using their integrated device cameras. In one example, the rotating marker may be an image that does not have symmetries that would confuse a processing component into not knowing the current angle that the image is rotated. In accordance with this example, a valid marker would be an image of a face, and an invalid marker would be an image of an equilateral triangle. In another example, the rotating marker includes a rotating region and a stationary region where the rotating region rotates around a rotational axis of the rotating marker adjacent (on or near) a perimeter of the stationary region.

Networked Computing Environment

Figure 1:
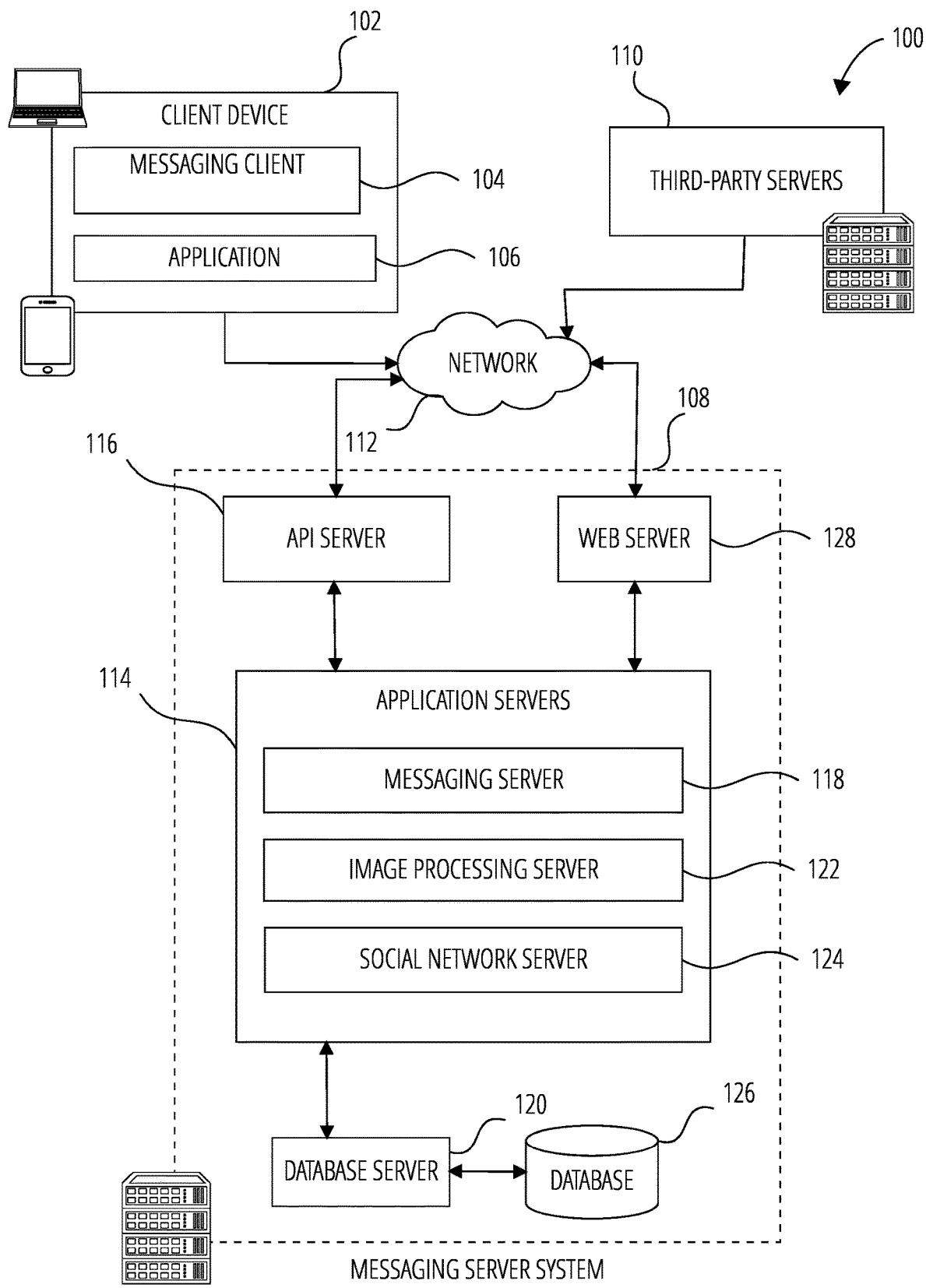
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of an electronic device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where an electronic device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the electronic device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., a story), the retrieval of a list of friends of a user of an electronic device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
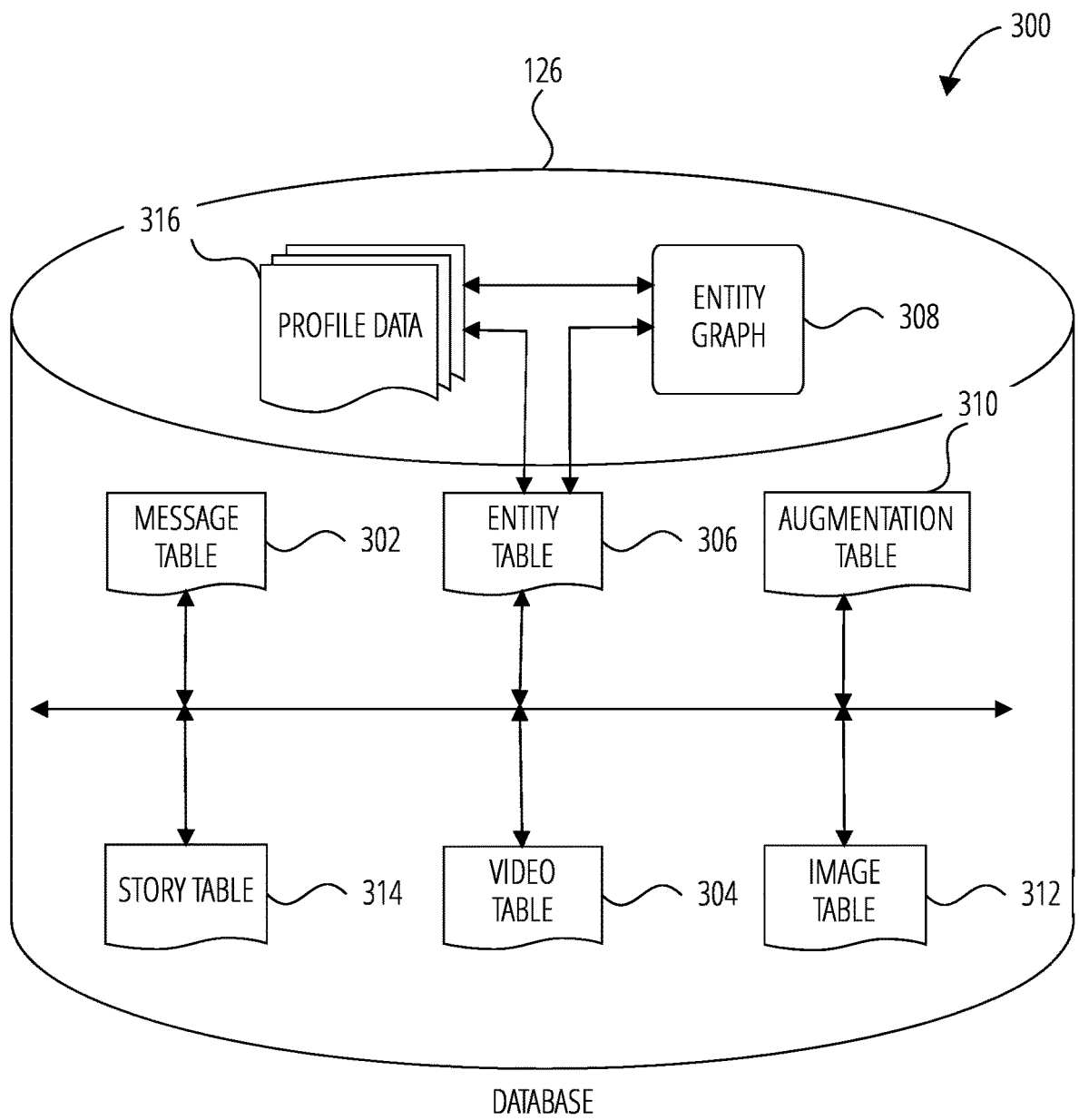
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the electronic device 102 (e.g., a "native app"), or a small-scale version of the application (e.g., an "applet") that is hosted on the electronic device 102 or remote of the electronic device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the electronic device 102 can be launched independently of and separately from the messaging client 104, such as by selecting an icon, corresponding to the application 106, on a home screen of the electronic device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the electronic device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the electronic device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
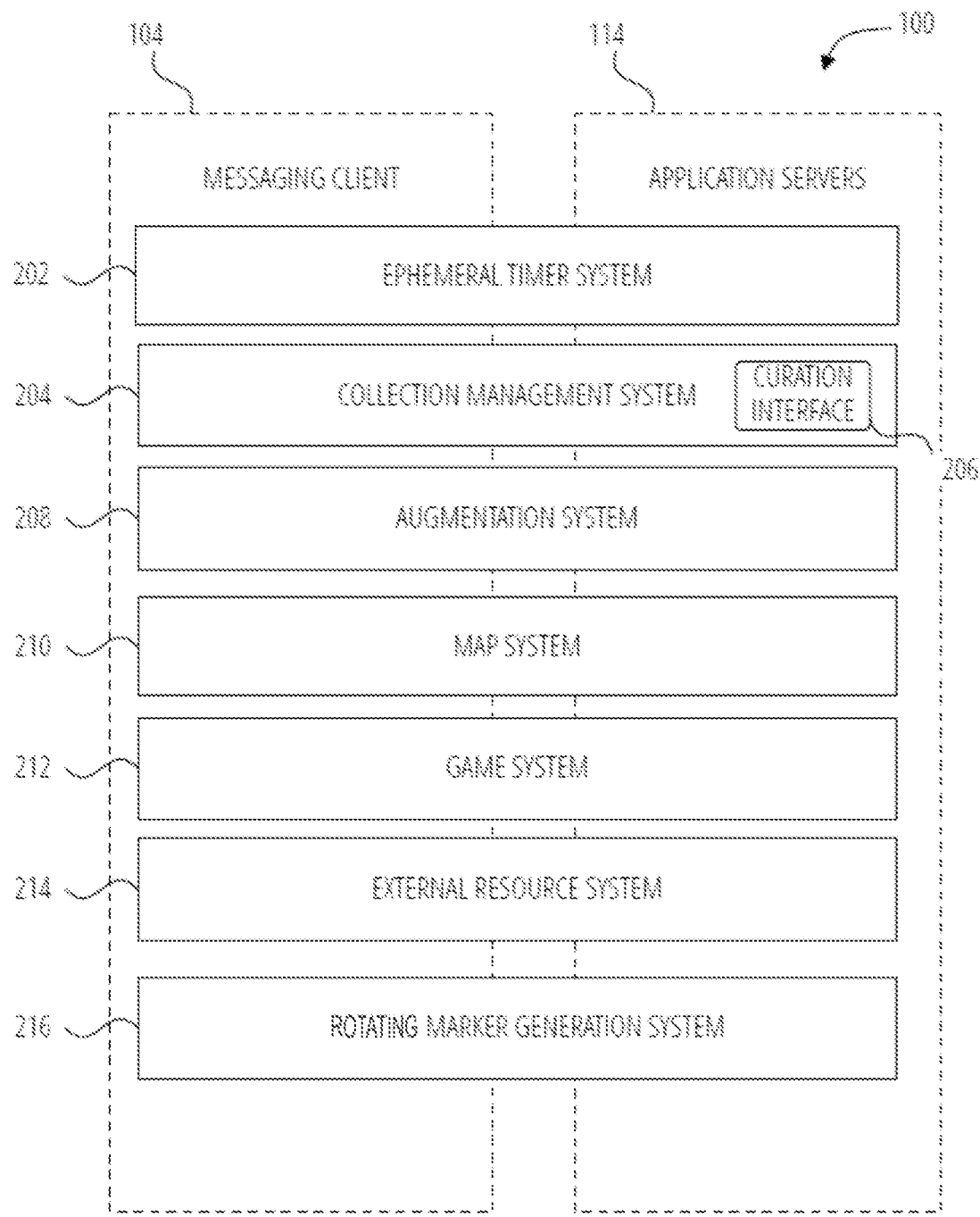
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a rotating marker system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the electronic device 102. In another example, the augmentation system 208 operatively supplies a media overlay to the messaging client 104 based on other information, such as social network information of the user of the electronic device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the electronic device 102. For example, the media overlay may include text or image that can be overlaid on top of a photograph taken by the electronic device 102. In another example, the media overlay includes an identification of a location overlay (e.g., Venice beach), a name of a live event, or a name of a merchant overlay (e.g., Beach Coffee House). In another example, the augmentation system 208 uses the geolocation of the electronic device 102 to identify a media overlay that includes the name of a merchant at the geolocation of the electronic device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 or launched by an application in response to detection of an identifier or a parameter by the electronic device 102, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on an electronic device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The rotating marker system 216 provides functions and routines for providing a visual experience (e.g., gaming experience or artistic media experience). In one example, the rotating marker system 216 includes functions and routines for generating a rotating marker for display on a monitor of a remote electronic device 102 and functions and routines for capturing images of the rotating marker, interpreting parameters thereof (e.g., rotation angle, speed of rotation, direction of rotation, color, pattern, or any combination thereof), and rendering a viewing experience on one or more of the viewing electronic devices 102.

Multiple viewing electronic devices 102 are able to simultaneously capture and interpret images of the rotating marker on the remote electronic device 102. This enables all viewing electronic devices 102 that are currently capturing images to render the same viewing experience without the need for on-line synchronization. One or more operations of the rotating marker system 216 are executed at one or more of the messaging client 104, the applications 106, the messaging server system 108, the applications servers 114, the messaging server 118, third-party server 110.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlays on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the electronic device 102.

Another type of filter is a data filter, which may be selectively presented to a sending user by the messaging client 104, based on other inputs or information gathered by the electronic device 102 during the message creation process. Examples of data filters include current temperature at a specific location, a current speed at which a sending user is traveling, battery life for an electronic device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of an electronic device 102 and then displayed on a screen of the electronic device 102 with the modifications. This also includes modifications to stored content, such as video clips in a gallery that may be modified. For example, in an electronic device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of an electronic device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the electronic device 102) and perform complex image manipulations locally on the electronic device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the electronic device 102.

In some examples, a computer animation model to transform image data can be used by a system where a user may capture an image or video stream of the user (e.g., a selfie) using an electronic device 102 having a neural network operating as part of a messaging client 104 operating on the electronic device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the electronic device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose electronic device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
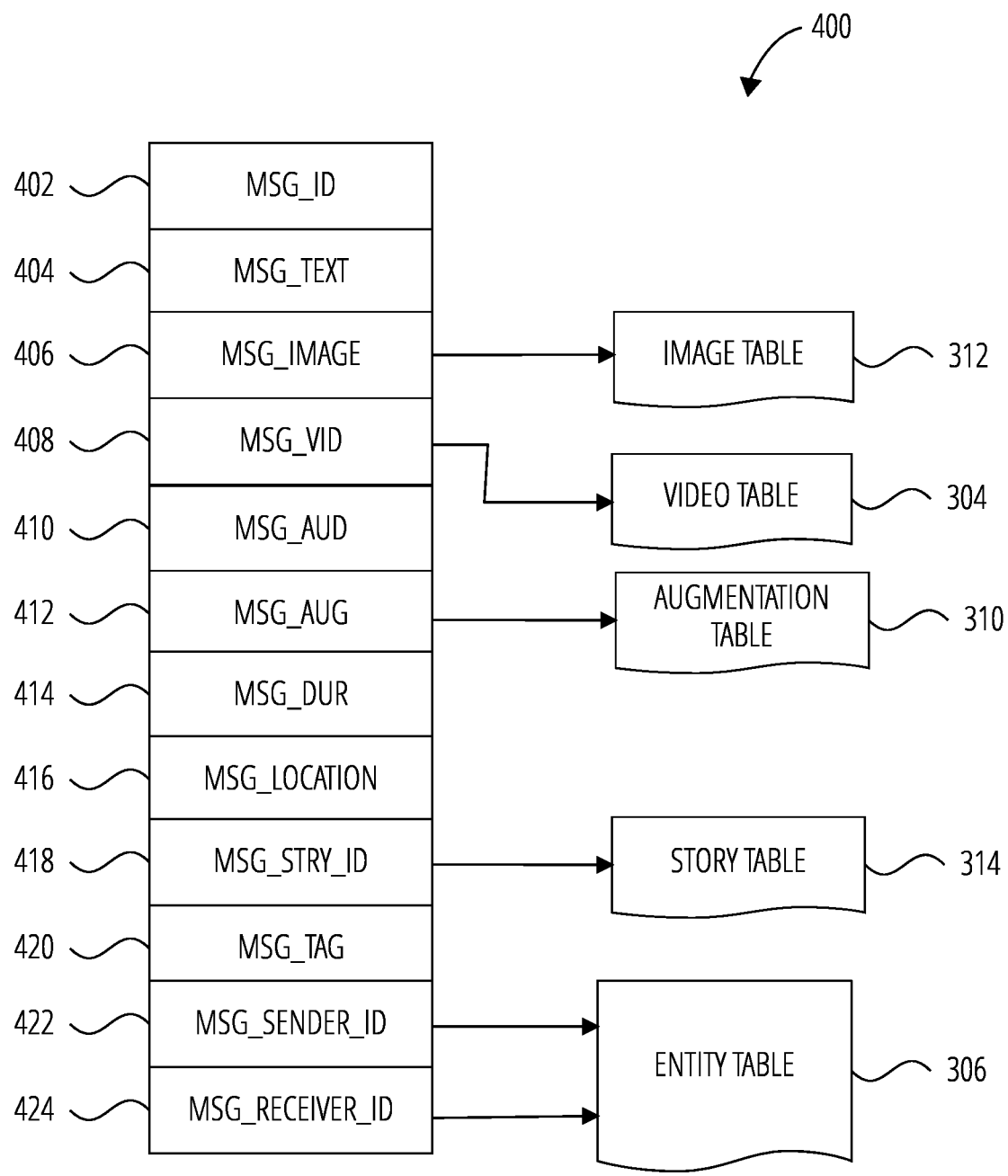
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the electronic device 102 or the application servers 114. A message 400 is shown to include the following example components:

- message identifier 402: a unique identifier that identifies the message 400.
- message text payload 404: text, to be generated by a user via a user interface of the electronic device 102, and that is included in the message 400.
- message image payload 406: image data, captured by a camera component of an electronic device 102 or retrieved from a memory component of an electronic device 102, and that is included in the message 400. Image data for a sent or received message 400 may be stored in the image table 312.
- message video payload 408: video data, captured by a camera component or retrieved from a memory component of the electronic device 102, and that is included in the message 400. Video data for a sent or received message 400 may be stored in the video table 304.
- message audio payload 410: audio data, captured by a microphone or retrieved from a memory component of the electronic device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the electronic device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
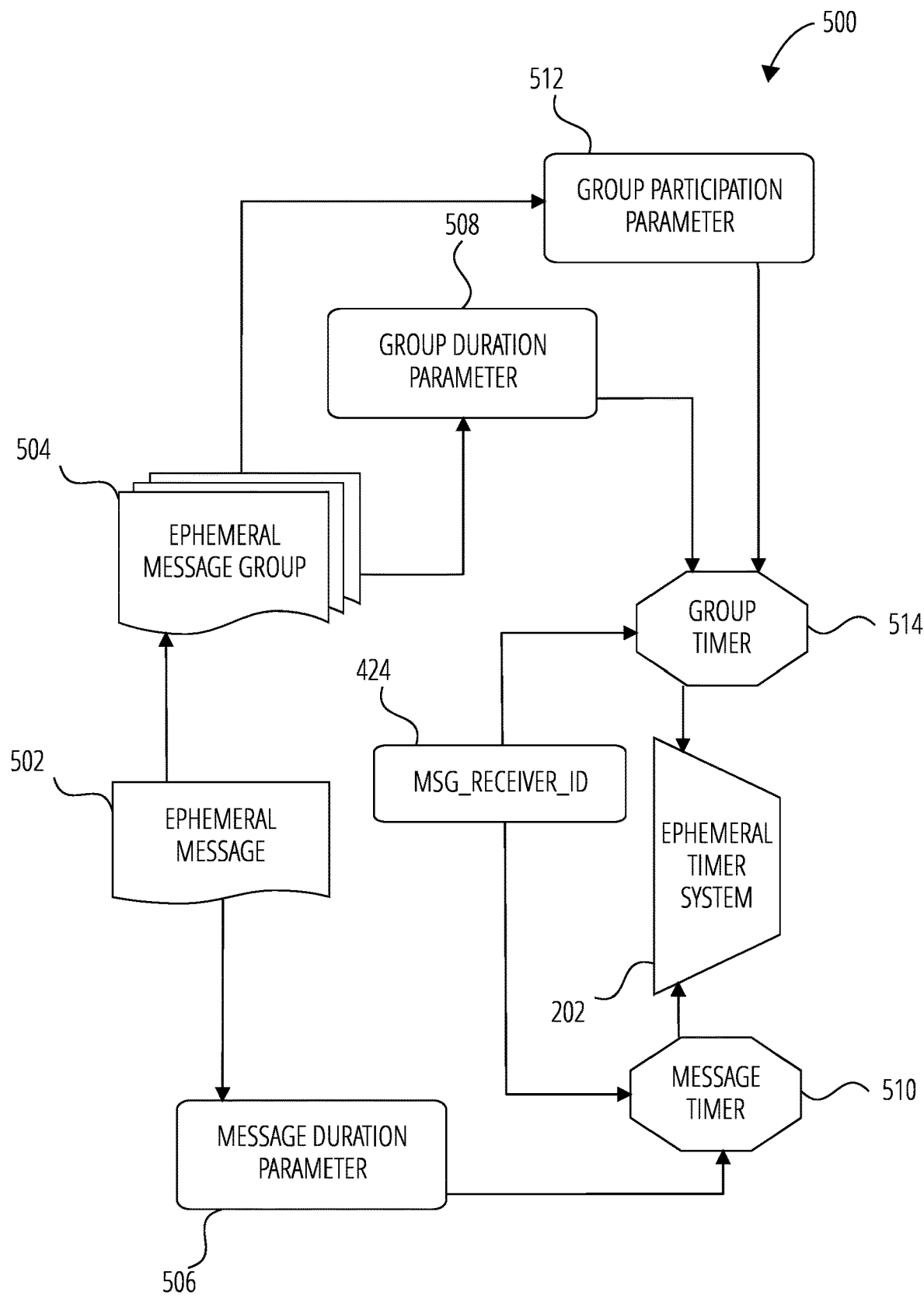
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
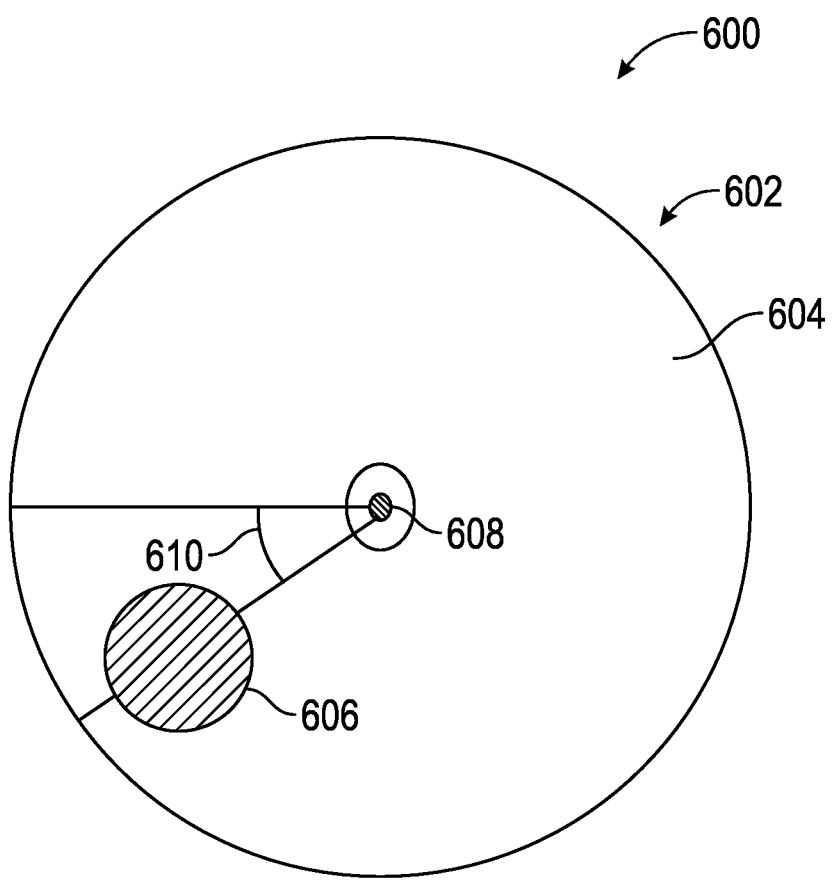
FIG. 6 is an illustration of a rotating marker in accordance with some examples.

FIG. 6 is a diagram 600 illustrating one example of a rotating marker 602 in accordance with some examples. In one example, the rotating marker 602 is a digital object or image that can be rendered as a two-dimensional image, a three-dimensional image, an augmented reality (AR) image, mixed reality (MR) image, or virtual reality (VR) image. The illustrated rotating marker 602 includes a stationary region 604 and a rotating region 606 positioned on the stationary regions 604. The rotating region 606 is positioned adjacent (on or near) the perimeter of the stationary region 604 and rotates about a rotation axis 608.

In another example of a rotating marker (not shown), the rotating marker may be a single image with a unique feature that enables detection of rotating. In accordance with this example, the image may be a circle with a small square adjacent the perimeter of the circle, a circle with a cutout on the perimeter, or a face.

Referring back to FIG. 6, the rotating marker 602 includes one or more adjustable parameters. Examples of adjustable parameters include one or more of an angle 610 of the rotating region 606 about the rotation axis 608 with respect to a fixed position, a speed of rotation, and a direction of rotation. Other example of adjustable parameters include a color of the stationary region 604, a pattern of the stationary region 604, a color of the rotating region 606, a pattern of the rotating region 606, or a combination thereof. The adjustable parameters of the rotating marker 602 correspond to features of viewing experiences presented on one or more viewing electronic devices 102. The stationary region 604 and the rotating region 606 can each be any media that includes one or more of visual content, visual effects or other AR, VR, and MR content items, overlays, image transformations, AR images, and similar graphics, icons, digital pictures, or digital objects.

As described in further detail below, a remote electronic device 102 presents the rotating marker 602 (e.g., on a monitor of a laptop, PC, or television) and one or more viewing electronic devices 102 capture and interpret images of the rotating marker to detect parameters of the rotating marker 602. The viewing electronic device(s) 102 then present and update a viewing experience in response to the detected parameters of the rotating marker 602. For example, when the rotating region 606 is rotating clockwise, the viewing electronic device 102 may update a gaming viewing experience to include a "friendly" target and, when the rotating region 606 is rotating counter-clockwise, the viewing electronic device 102 may update the gaming viewing experience to include a "friendly" target. When viewing electronic device(s) 102 are capturing and interpreting images of the same rotating marker 602, the users of those device 102 can share in a viewing experience having common characteristics without the need for an on-line synchronization connection.

In some examples, an animation function is applied to the stationary region 604, the rotating region 606, or both, e.g., a rotation function, translation function, or deformation function in a two-dimensional, three-dimensional, AR, MR, or VR environment. While the stationary region 604 or the rotating region 606 may be enabled for animation, the rotating marker 602 as a whole is fully animated. The animation of the rotating marker 602 is rendered as the rotating region 604 or the stationary region 606 being rotated, translated, or deformed around a rotational axis of the rotating marker 602.

Still referring to FIG. 6, the rotating marker 602 can take any shape or form and rendered as an icon, object, a media overlay that includes visual content and visual effects or other AR, VR, and MR content items, overlays, image transformations, AR images, and similar graphics, icons, digital pictures, or digital objects. The rotating marker 602 can also be rendered as an animation in two-dimensional space, three-dimensional space, an AR environment, an MR environment, or a virtual environment. The animation includes a rotation animation function, deformation animation function, translation animation function, or other animated visual effects. In other examples, the rotating marker 602 is modified by applying an animation to aspects of the rotating marker 602, such as the rotation animation function or by moving the rotating region 606 around the stationary region 604 or around a rotational axis of the stationary region 604. The animation can be configured at different speeds, such as, slow, medium, or fast.

Figure 7:
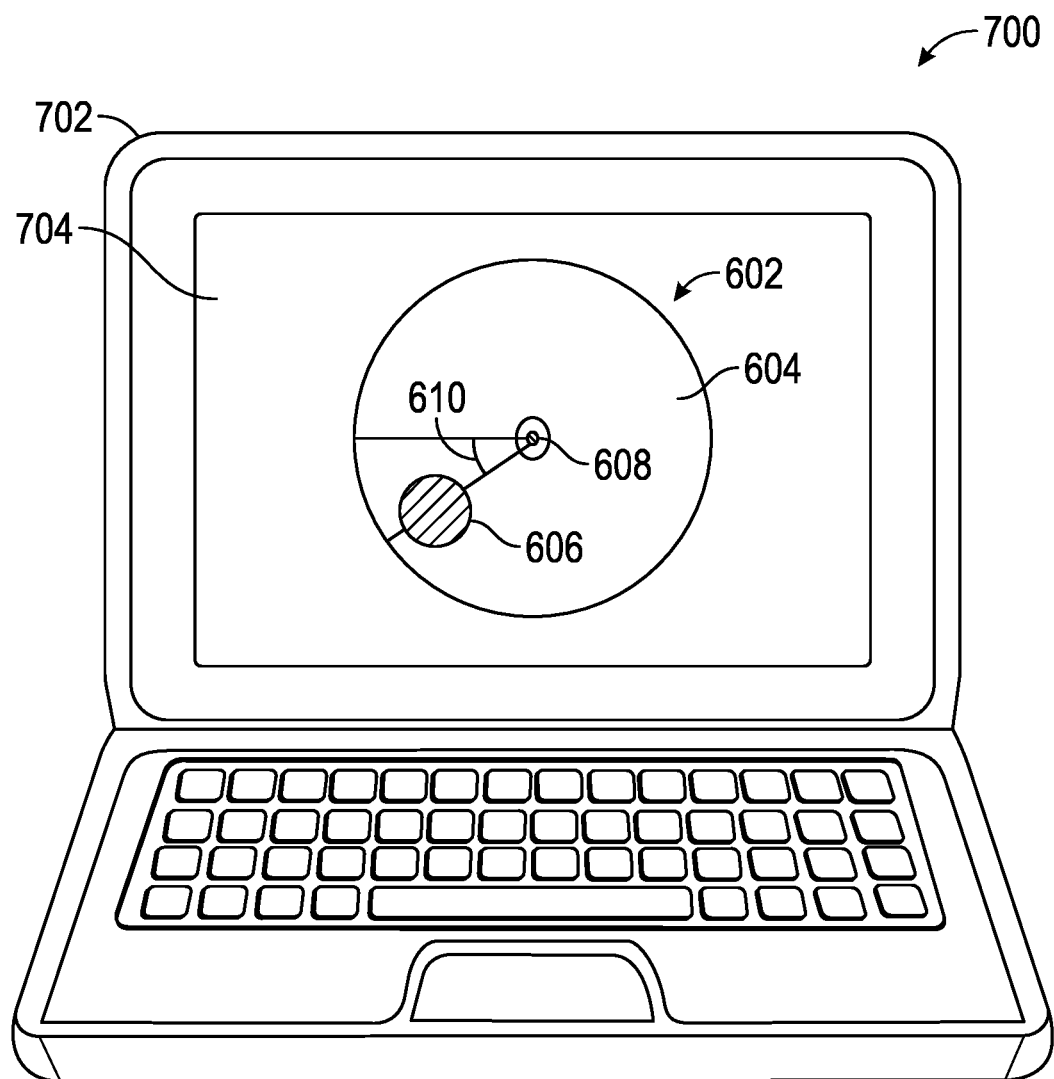
FIG. 7 is an illustration of a rotating marker presented on a monitor of a remote electronic device for capture by respective camera systems of one or more viewing electronic device in accordance with some examples.

FIG. 7 is a diagram illustrating a remote electronic device 700 (embodied as a laptop with a display device 702) presenting the rotating marker 602 on a monitor 704 in accordance with some examples. In some examples, multiple viewing electronic device 102 (not shown in FIG. 7) capture images of the rotating marker 602 as it is being rendered on the monitor 704 of the display device 702. The display device 702 can be any device display enabled to render or display the rotating marker 602 or other images, such as a computing device, laptop, desktop computer, smartphone, wearable display device, television, or the like. For illustration purposes, the display device 702 corresponds to a laptop that includes a display device monitor 704. The rotating marker 602 is rendered at the center of a coordinate plane projected on the display device monitor 704. In other examples, the rotating marker 602 can be rendered on the display device monitor 704 at any point or location thereon.

As shown in FIG. 7, an animation function is applied to the rotating marker 602. The rotating region 606 rotates about a rotation axis 608 of the stationary region 604. The animation function applied to the rotating marker 602 are functions altering one or more parameters of the rotating marker 602, e.g., a rotating animation, moving animation, or deforming animation of or within the stationary region 604.

Figure 8:
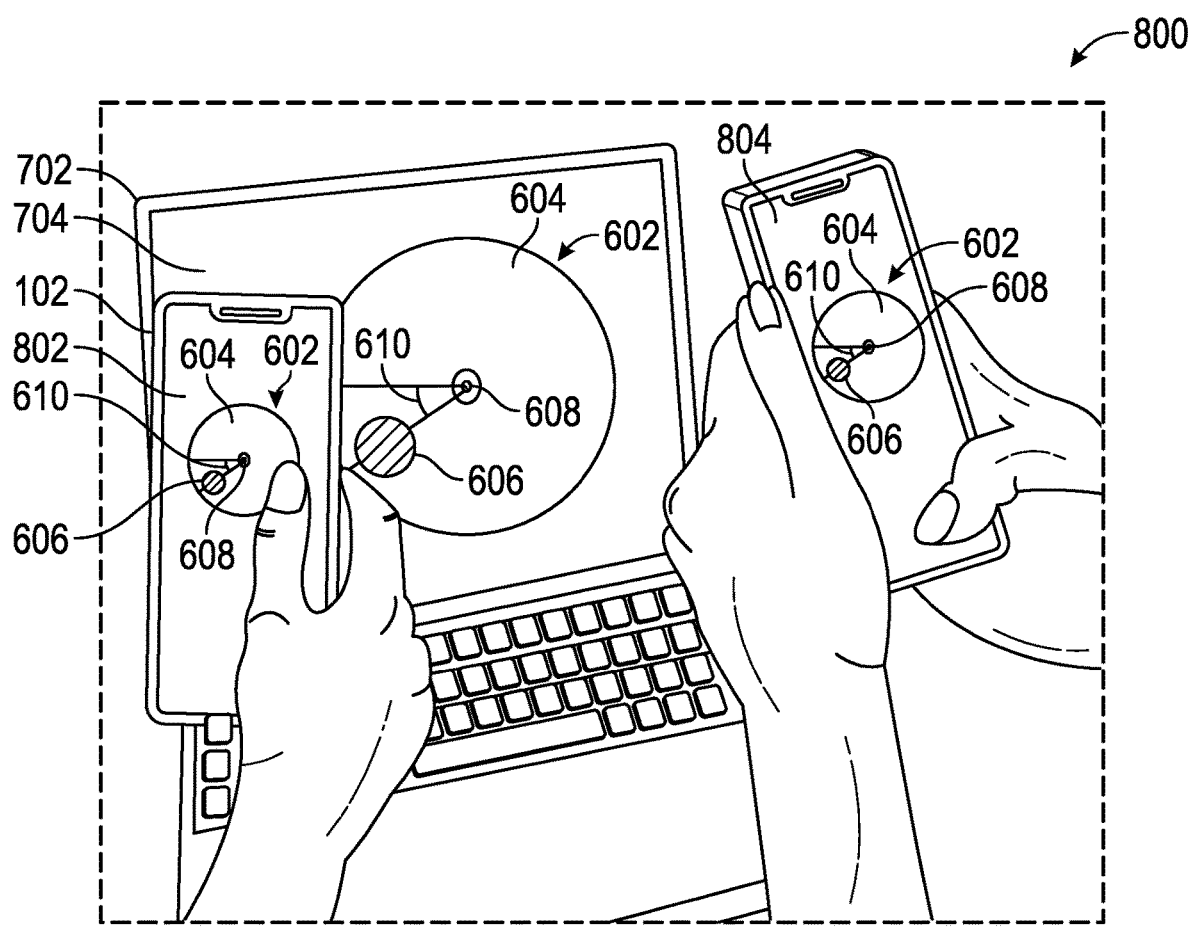
FIG. 8 is a perspective view illustrating the rotating marker displayed on a remote electronic device and on first and second viewing electronic devices in accordance with some examples.

FIG. 8 is a perspective view 800 illustrating the rotating marker 602 displayed on a remote electronic device 702 and on first and second viewing electronic devices 102 in accordance with some examples. As shown in FIG. 8, the rotating marker 602 is rendered on each display of each viewing electronic device 102 as they capture the rotating marker 602 being displayed on the remote electronic device display monitor 704 of the laptop 702. The rotating marker 602 is displayed at the center of viewing electronic device display 802 and at the center of viewing electronic device display 804.

Figure 9A:
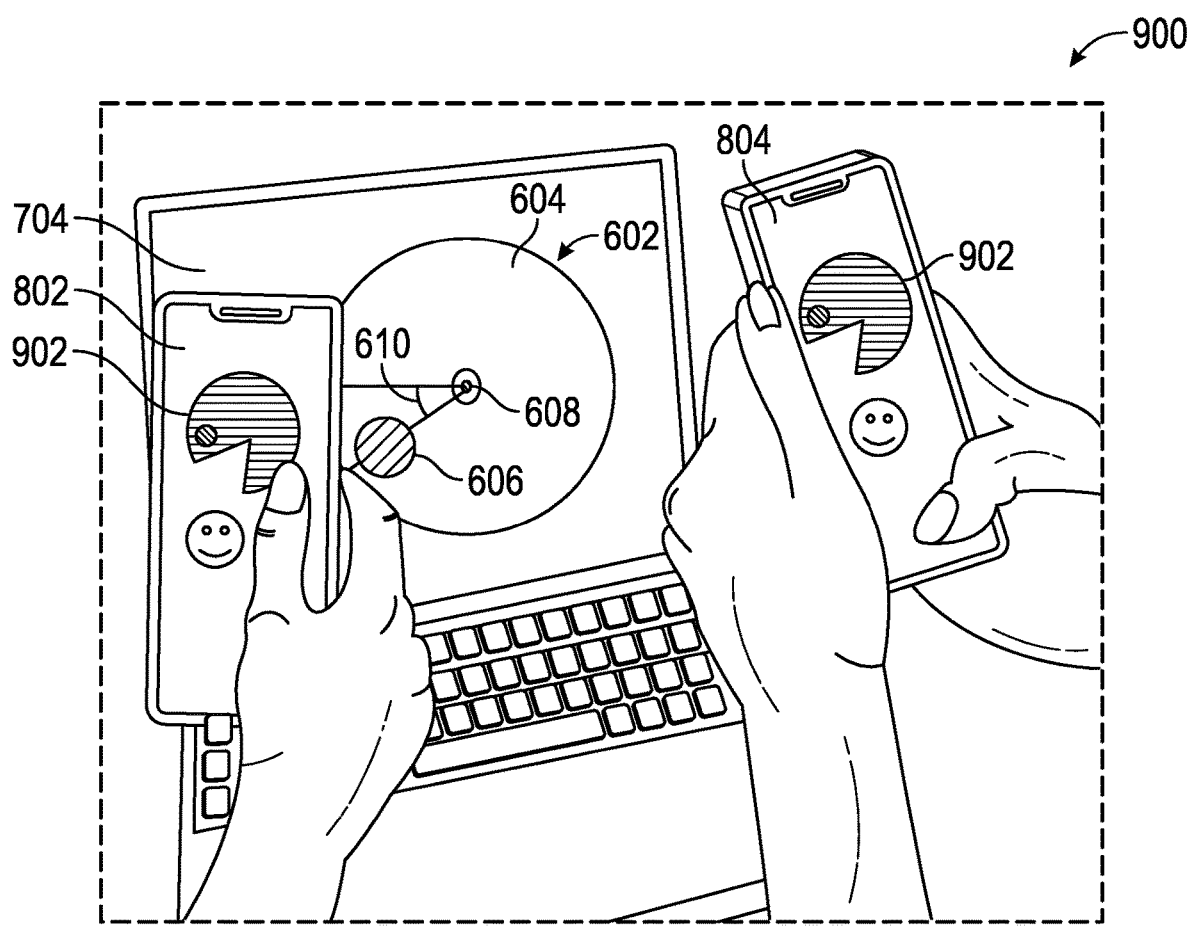
FIG. 9A is a diagram illustrating a user interface of a visual experience embodied as a game displayed on the first and second viewing electronic devices in accordance with some examples.

Each viewing electronic device 102 monitors and captures the animation of the rotating marker 602 as the rotating marker 602 is being presented by the remote electronic device display monitor 704. In one example, the client devices 102 detect or capture the rotating marker 602 displayed on display device 702 using cameras integrated into their respective devices. In other examples, any device that is enabled to capture images using image analysis techniques and image recognition of visual marker routines and processing can be used to detect and capture the rotating marker 602. As shown in FIG. 9A, the viewing client devices 102 are capturing and detecting the rotating marker 602 displayed on electronic device display monitor 704 from two different viewpoints and perspectives. In some examples, the rotating marker 602 can be captured from multiple viewpoints and visual perspectives relative to the electronic device display monitor 704 and client devices 102 point of origin.

FIG. 9A is a perspective view illustrating a visual experience (embodied as a gaming experience) displayed on the first and second viewing electronic devices 102 in accordance with some examples. A visual experience application, such as a visual experience 902, is rendered and displayed on viewing electronic device display 802 and viewing electronic device display 804 as each device concurrently captures the rotating marker 602.

Figure 9C:
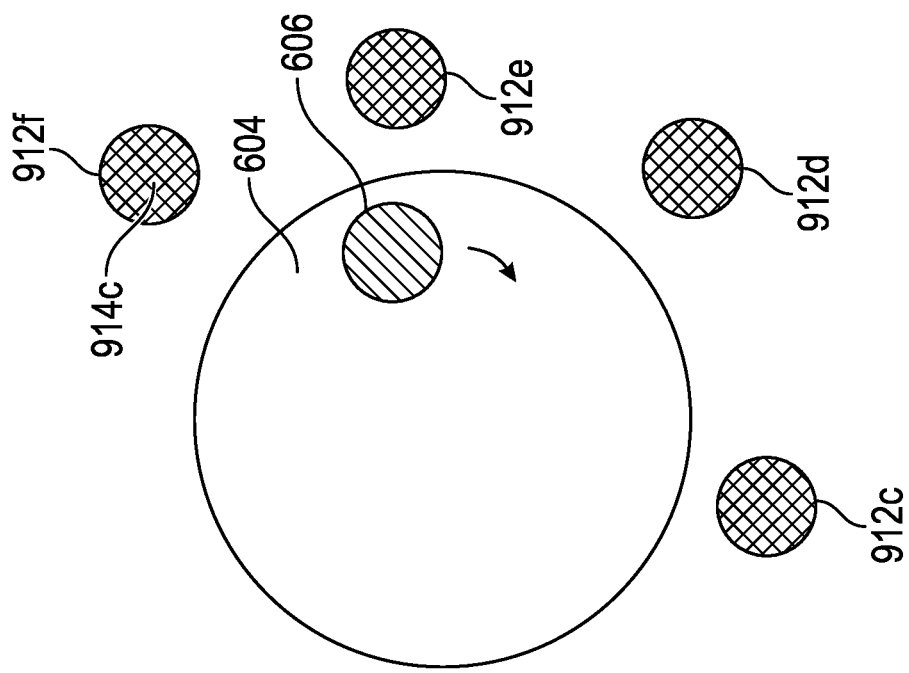
FIGS. 9B, 9C, 9D, and 9E are diagrams illustrating user interfaces of visual experiences embodied as games on a viewing electronic device in accordance with some examples.
Figure 9B:
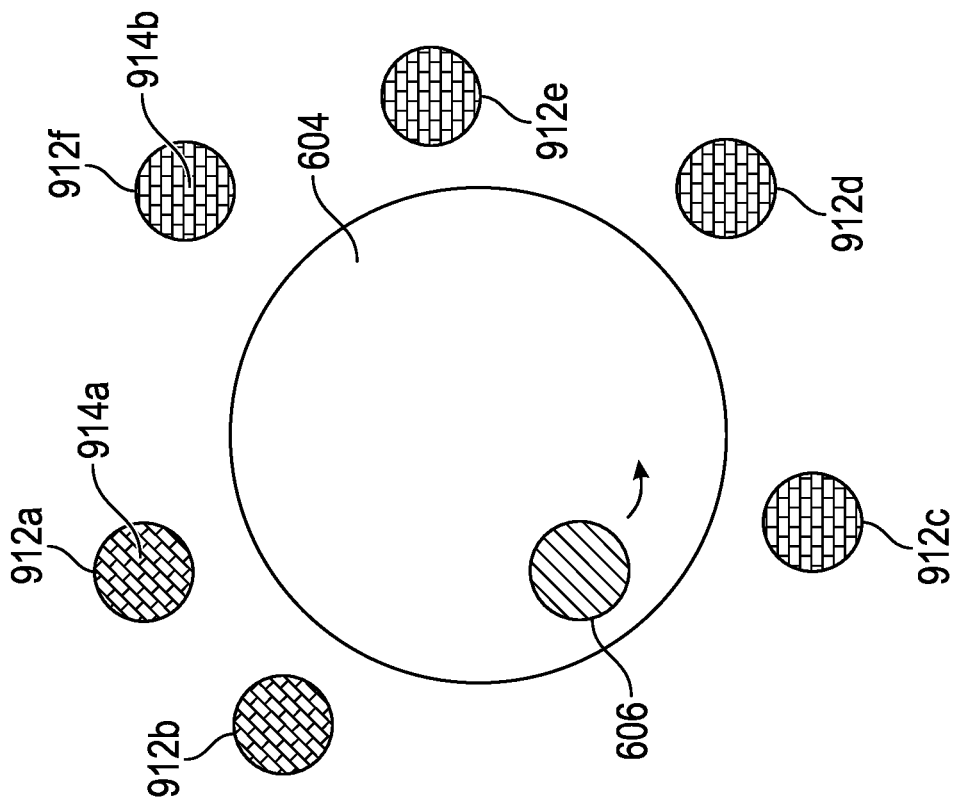

FIGS. 9B and 9C are illustrations for describing one gaming visual experience. In FIGS. 9B and 9C, a representation of the rotating marker 602 is presented. Around the perimeter of the rotating marker stationary region 604 are selectable items 912. In one example of the gaming visual experience, a user is able to select an item 912 only when the rotating region 606 is rotating counter-clockwise (FIG. 9B) and the rotating region 606 is within a predefined distance of the item 912. When a user successfully selects an item 912, a characteristic of the item is changed, e.g., the item's pattern. The rotating region 606 is controlled by an application generating the rotating marker 602 such that it randomly changes direction and speed.

In FIG. 9B, items 912a and 912b, which have been selected, are depicted with a first display pattern 914a characteristic. Items 912c, d, e, f have not been selected and have a second display pattern 914b characteristic. In the illustration, rotating region 606 is approaching item 912c, which will result in a user being able to select item 912c.

When the rotating region 606 is rotating clockwise (FIG. 9C), the user is not able to select any of the remaining items 912c, d, e, f. Items 912c, d, e, f, which have not been selected, and are currently not selectable, have a third display pattern 914c characteristic.

Figure 9D:
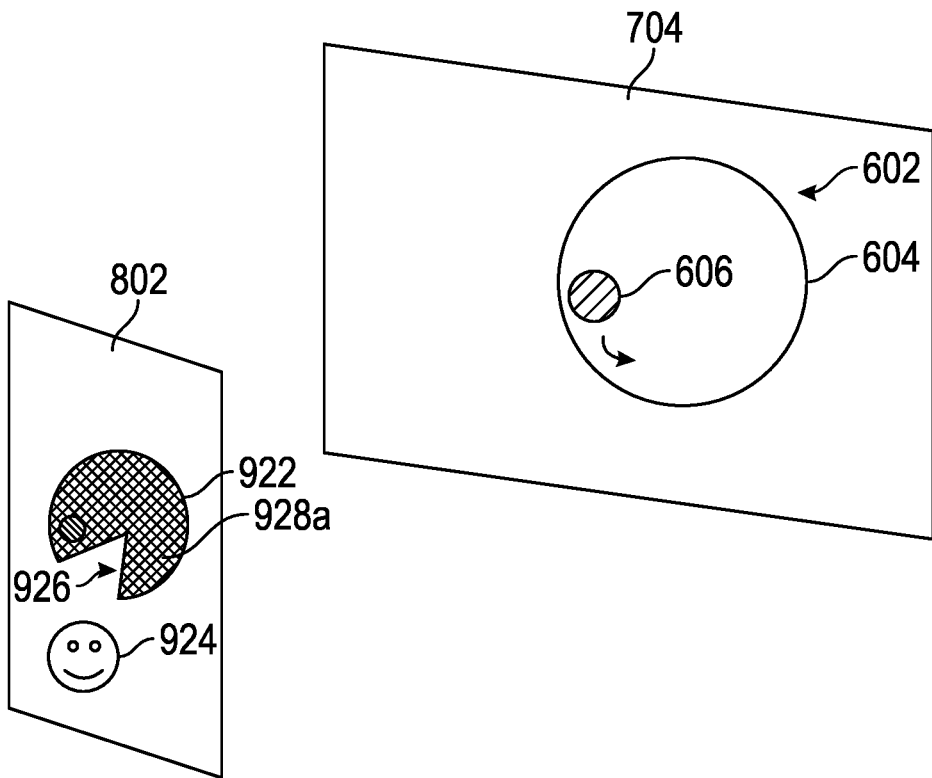
Figure 9E:
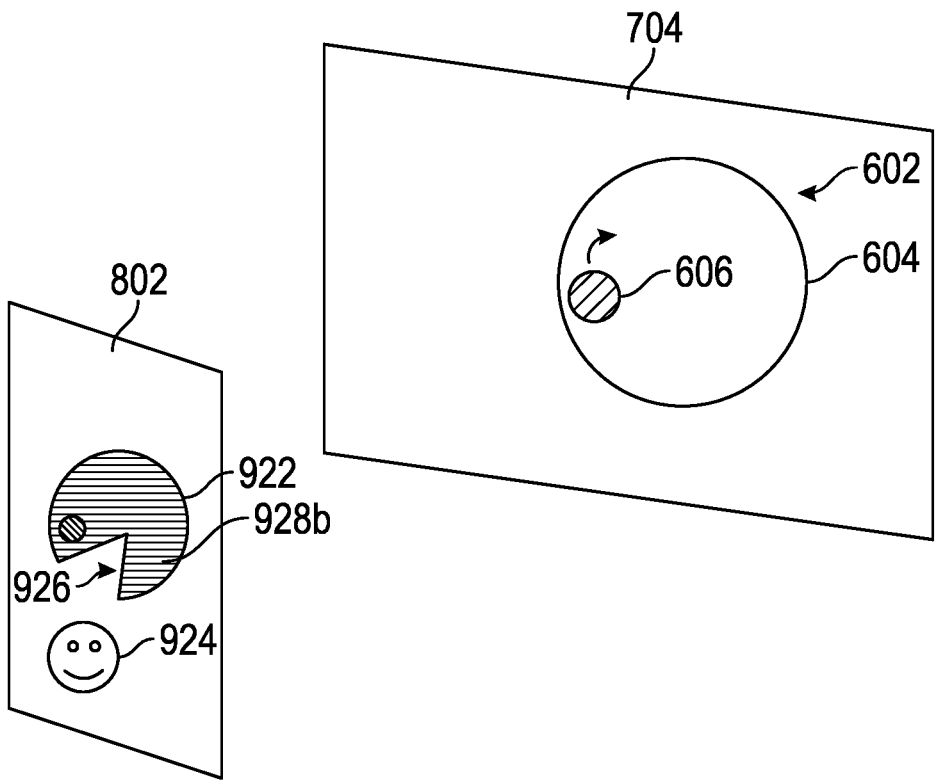

FIGS. 9D and 9E are illustrations for describing another gaming visual experience. In FIGS. 9B and 9C, an alternative graphical representation (character 922 with an open mouth 926) for the rotating marker 602 is presented on the viewing electronic device display 802. The graphical representation 922 rotates such that an eye of the character 922 corresponds in angular position to the rotating region 606 from the rotating marker 602. The rotating region 606 is controlled by an application generating the rotating marker 602 such that it randomly changes direction and speed (which results in the character 922 changing direction and speed when captured and interpreted by a viewing electronic device 102.

Additionally, another character 924 is positioned on the viewing electronic device display 802. A user of the viewing electronic device 102 is able to control the position of the other character 924 by rotating the phone (e.g., as determined based on input from an IMU or through SLAM processing) which results in a corresponding movement of the character 924 or through input on a touchscreen display in which the user is able to drag the character around the viewing electronic device display 802.

In one example of this gaming visual experience, a user scores points by positioning the other character 924 in the mouth 926 of the character 922 when an adjustable feature of the character 922 is in a first state and loses points when the other character 924 is within the mouth 926 of the character 922 when the adjustable feature of the character 922 is in a second state. The state of the adjustable feature is tied to the rotation direction of the rotating region 606 and is communicated to the user by the color of the character 922. For example, if the rotating region 606 is rotating counter-clockwise (FIG. 9D), which is associated with the first state, the character 922 may be presented with a first color or pattern 928a. On the other hand, if the rotating region 606 is rotating clockwise (FIG. 9E), which is associated with the second state, the character 922 may be presented with a second color or pattern 928b.

Figure 9F:
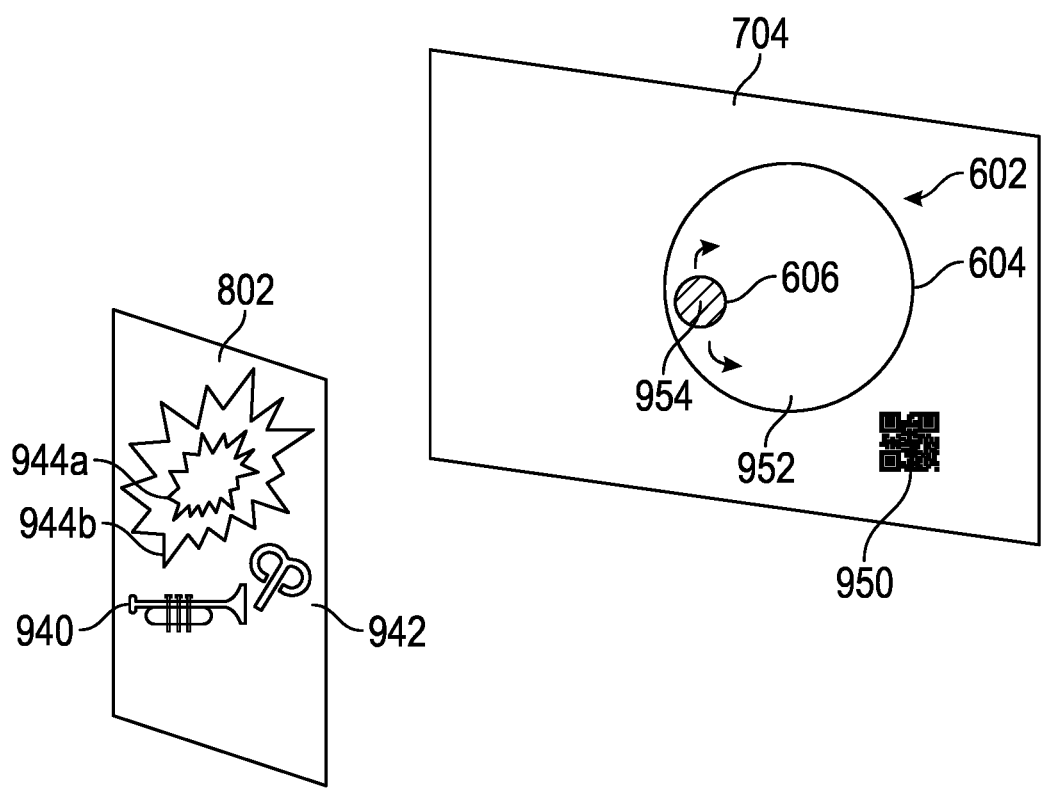
FIG. 9F is a diagram illustrating a user interface of a visual experience embodied as artistic media on a viewing electronic device in accordance with some examples.
Figure 10A:
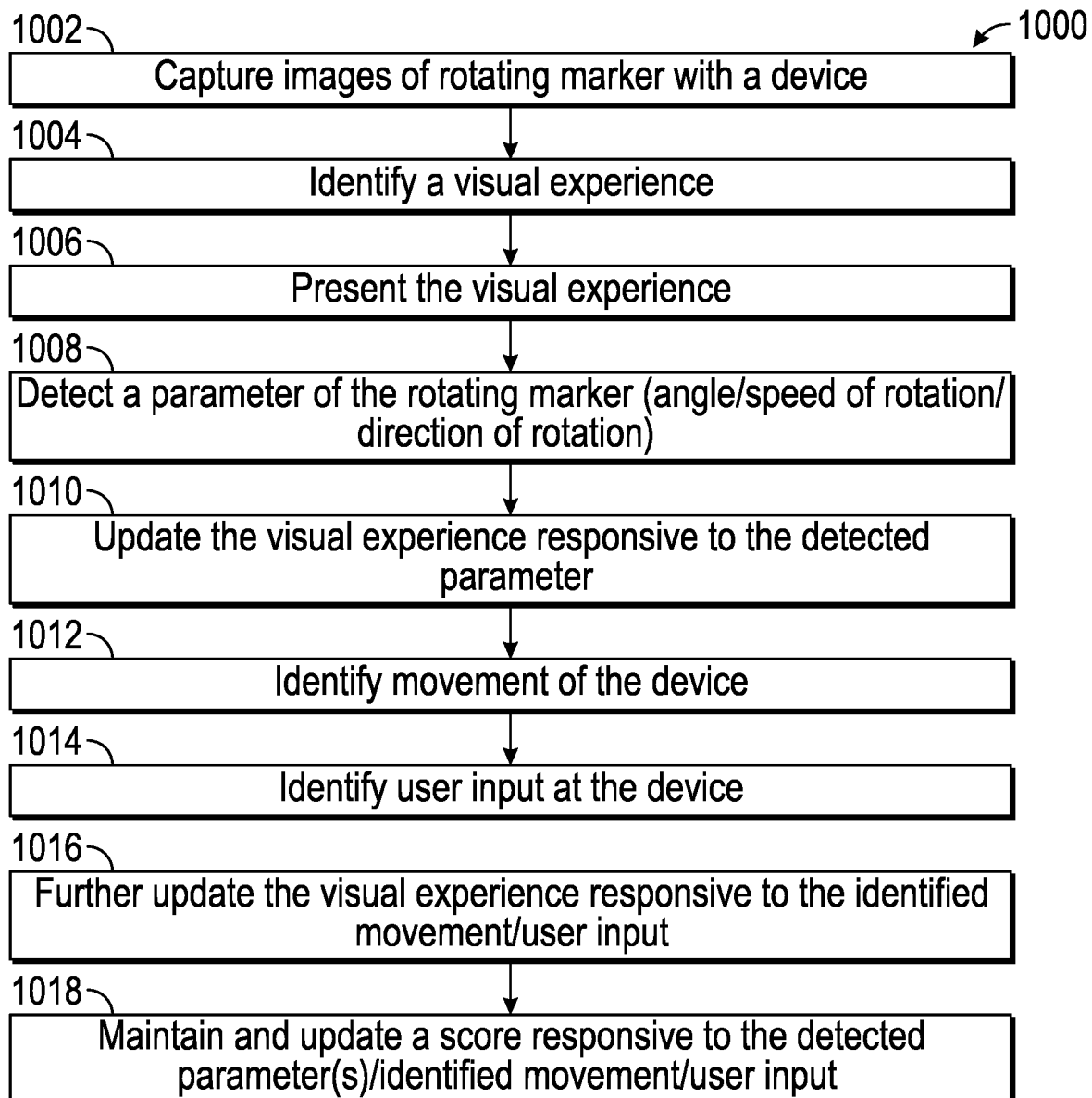
FIGS. 10A, 10B, 10C, and 10D are flowchart illustrating methods capturing and interpreting a rotating marker associated with a visual experience presented on one or more viewing electronic devices in accordance with some examples.
Figure 10B:
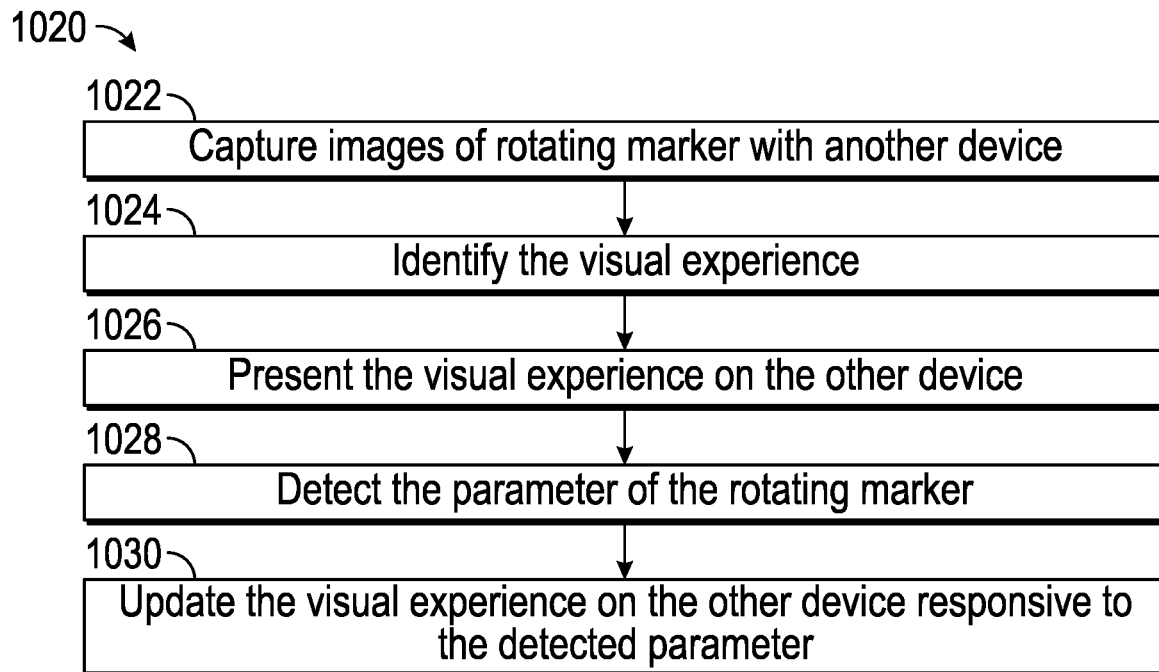
Figure 10C:
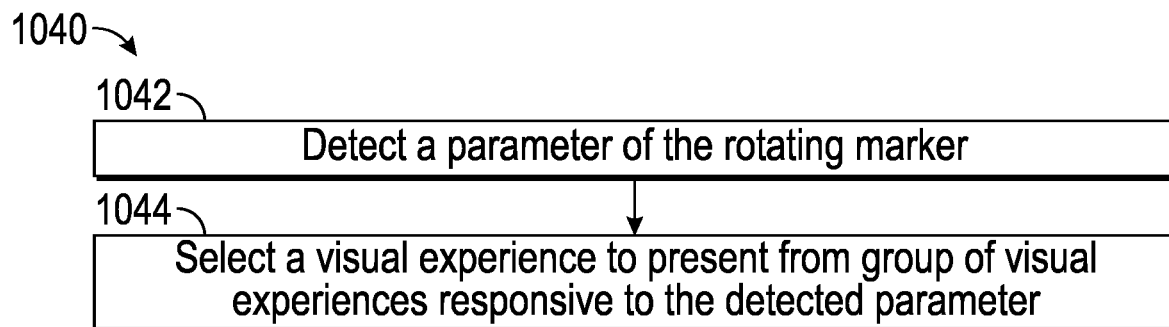
Figure 10D:
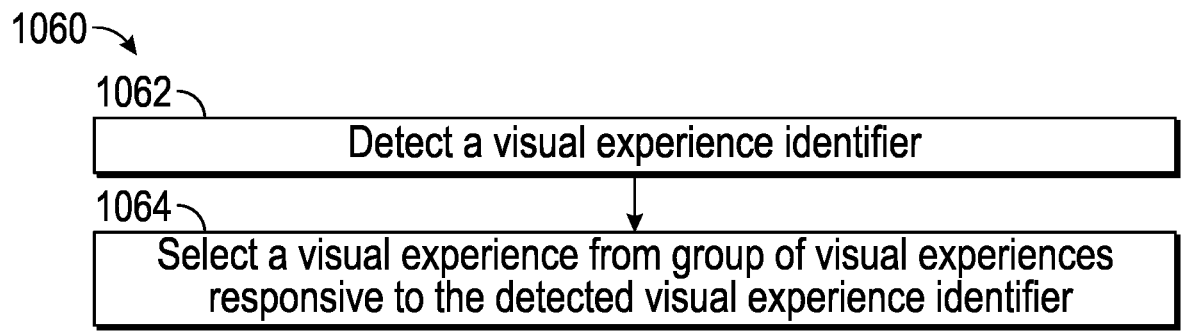
Figure 10E:
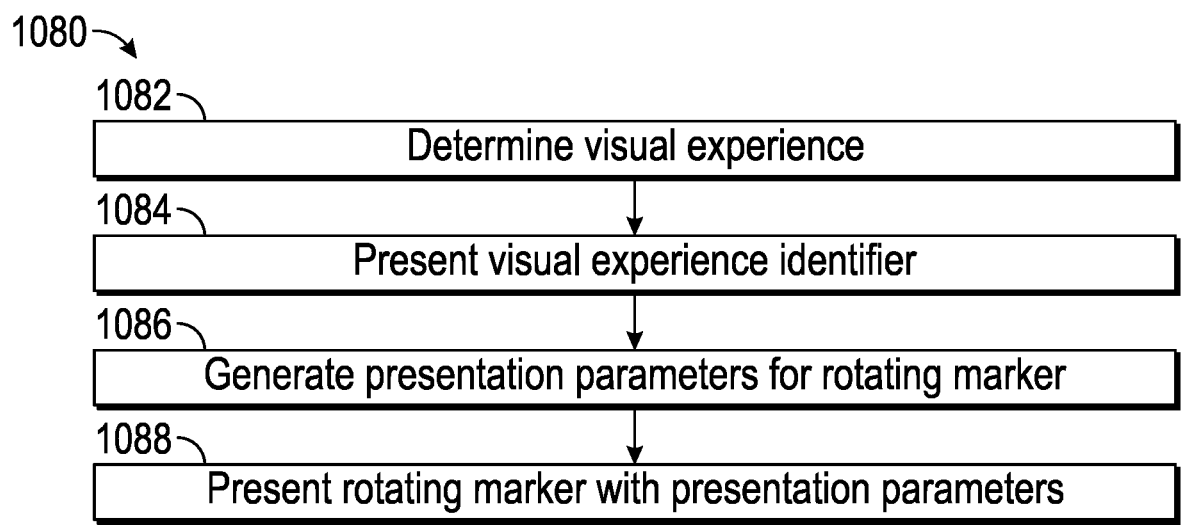
FIG. 10E is a flowchart illustrating a method for generating a rotating marker on a remote electronic device associated with a visual experience to be presented on one or more viewing electronic devices in accordance with some examples.

FIG. 9F is an illustration for describing an artistic media visual experience. In FIG. 9F, a visual image such as a scene with a horn 940 is presented on the viewing electronic device display 802. In response to interpreting the rotating marker 602 presented on the remote electronic device display monitor 704, adjustable features such as an air icon 942 are presented when the rotating region is rotating clockwise and another icon (not illustrated) is presented with the rotating region is rotating counter-clockwise. Additional adjustable features such as clash icons 944a, b may be presented based on the rate of rotation. For example, below a predefined rate of rotation, a first clash icon 944a may be presented and, at or above the predefined rate of rotation, a second clash icon 944b may be presented. Each of the icons may have a corresponding volume level.

FIG. 9F additionally illustrates a visual experience identifier (such as a barcode 950) presented on the remote electronic device display monitor 704 for informing a client electronic device 102 of which visual experience to present. The visual experience identifier may be positioned on or adjacent the rotating marker 602. An interior region 952 of the stationary region 604 and an interior region 954 of the rotating region 606 may have adjustable features such as color or pattern to convey additional information. For example, the type of horn to present may be selected based on the color of the interior region 952 of the stationary region 604.

FIGS. 10A-10E are flowcharts illustrating methods 1000, 1020, 1040, 1060, and 1080 for using a rotating marker associated with a visual experience to enable offline synchronization of the visual experience for multiple users of respective viewing electronic devices 102. The methods may be implemented as applications present on and executed by the respective devices. While certain operations of the methods 1000, 1020, 1040, 1060, and 1080 are described as being performed by certain devices, in different examples, different devices or a combination of devices may perform these operations. In one example, one or more operations described below as being performed by the viewing electronic device 102 may also be performed in combination with server-side computing device (e.g., the message messaging server system 108), or third-party server computing device. Likewise, one or more operations described below as being performed by the remote electronic device 102 may also be performed in combination with server-side computing device (e.g., the message messaging server system 108), or third-party server computing device.

Although the below description of the methods refers to the rotating marker system 216 running on client devices 102, other systems and devices for viewing or interacting with visual experiences based on the rotating marker system 216 will be understood from the description herein. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of a methods may be performed in whole or in part, may be performed in conjunction with some or all of the steps in other methods, or may be performed by any number of different systems, such as the systems described in FIGS. 1-9 and 11-13.

Flowchart 1000 depicts example steps for experiencing a viewing experience at a viewing electronic device 102. At block 1002, a viewing electronic device 102 captures images of a rotating marker 602. In one example, the viewing electronic device 102 captures images, presented on a display of a remote device display monitor 702, with an integrated camera. Multiple viewing electronic devices 102 may simultaneously capture images of a current state of the rotating marker in order to share a visual experience. Example visual experiences include gaming experiences and artistic media experiences. Artistic media includes still or video images with optional overlays.

At block 1004, the viewing electronic device 102 identifies a visual experience. In one example, the viewing electronic device 102 identifies a separate visual identifier (e.g., a barcode) in the captured images corresponding to a visual experience presented on a monitor coupled to the remote client device. In another example, the viewing electronic device 102 identifies a parameter of the rotating maker corresponding to the visual experience. In accordance with this example, a parameter such as the color of the stationary region 604 may be identified that corresponds to the visual experience. The viewing electronic device 102 may select the visual experience from a plurality of visual experiences on or available to the viewing electronic device 102. The viewing electronic device 102 may use machine vision to compare the captured images to previously captured images corresponding to respective viewing experiences. A visual experience is identified when a confidence threshold (e.g., 99.8%) is exceeded by a machine vision algorithm.

At block 1006, the viewing electronic device 102 presents the visual experience. The viewing electronic device 102 presents the visual experience on a display of the viewing electronic device. The viewing electronic device may present the visual experience responsive to the identification and retrieval of the visual experience.

At block 1008, the viewing electronic device 102 detects a parameter(s) of the rotating marker 602. In one example, the viewing electronic device 102 detects a parameter such as speed of rotation, direction of rotation, a rotation angle, color(s) of a region(s), pattern(s) of region(s). The viewing electronic device 102 may use machine vision to analyze the captured images to determine parameters of the rotating marker 602.

At block 1010, the viewing electronic device 102 updates the visual experience responsive to the detected parameter(s). The viewing electronic device 102 presents the updated visual experience on the display of the viewing electronic device. In one example, the viewing electronic device 102 matches detected parameters to previously stored adjustable features of the visual experience and implements the matching adjustable features in the visual experience.

At block 1012, the viewing electronic device 102 identifies movement of the viewing electronic device. Movement of the viewing electronic device 102 may be determined from an inertial measurement unit (IMU), from the captured imaged using simultaneous localization and mapping (SLAM) processing, or a combination thereof.

At block 1014, the viewing electronic device 102 identifies user input at the device. In one example, the viewing electronic device 102 includes a touch sensitive display. In accordance with this example, user input may be received via the touch sensitive display.

At block 1014, the viewing electronic device 102 further updates the visual experience responsive to the identified movement/user input. In one example, sensed movement of the viewing electronic device 102 results in a corresponding movement of a character on a screen of the viewing electronic device. In another example, use input sensed on the touch sensitive display in the region of a selectable item results in selection of that item.

At block 1016, the viewing electronic device 102 maintains and updates a score responsive to the detected parameter(s), identified movement, and user input. For example, the viewing electronic device 102 may maintain a tally in memory (and optionally displayed on the display of the viewing electronic device 102) and update the score by increasing the tally responsive to some combinations of the detected parameter(s), identified movement, and user input and by decreasing the tally responsive to other combinations of the detected parameter(s), identified movement, and user input.

Flowchart 1020 depicts example steps for experiencing the viewing experience at another viewing electronic device 102. At block 1022, another viewing electronic device 102 captures images of the rotating marker, e.g., as described above with respect to block 1002. At block 1024, the viewing electronic device 102 identifies the visual experience, e.g., as described above with respect to block 1004. At block 1026, the viewing electronic device 102 presents the visual experience on the other device, e.g., as described above with respect to block 1006. At block 1028, the viewing electronic device 102 detect the parameter of the rotating marker, e.g., as described above with respect to block 1008. At block 1030, the viewing electronic device 102 update the visual experience on the other device responsive to the detected parameter, e.g., as described above with respect to block 1010.

Flowchart 1040 depicts example steps of a method for selecting a visual experience for viewing on a viewing electronic device 102. At block 1042, a viewing electronic device 102 detects a parameter of the rotating marker, e.g., as described above with respect to block 1008. At block 1044, the viewing electronic device 102 selects a visual experience to present from group of visual experience stored or retrievable by the viewing electronic device 102 responsive to the detected parameter.

Flowchart 1060 depicts example steps of another method for selecting a visual experience for viewing on a viewing electronic device 102. At block 1062, a viewing electronic device 102 detects a visual experience identifier. The viewing electronic device 102 may use machine vision to compare the captured images to previously captured images corresponding to respective viewing experiences. A visual experience is identified when a confidence threshold (e.g., 99.8%) is exceeded by a machine vision algorithm. At block 1064, the viewing electronic device 102 selects a visual experience from a group of visual experiences responsive to the detected visual experience identifier.

Flowchart 1080 depicts example steps of a method for generating a rotating marker at a remote electronic device. At block 1082, the remote client device 102 determines a visual experience. In one example, the remote client device 102 randomly identifies the visual experience by randomly selecting the visual experience from one of a plurality of visual experiences stored in the memory of the remote client device (e.g., responsive to a software or hardware random number generator). In another example, the remote client device 102 determines the visual experience by receiving a selection (e.g., via a wireless communication) from a viewing electronic device 102 that is viewing the remote client device 102 and selecting the visual experience from one of a plurality of visual experiences stored in the memory of the remote client device 102 corresponding to the received selection.

At block 1084, the remote client device 102 present a visual experience identifier corresponding to the selected visual experience. In one example, the remote client device 102 presents a separate visual identifier (e.g., a barcode) corresponding to the selected visual experience on a monitor coupled to the remote client device. In another example, the remote client device 102 presents the rotating maker with a parameter corresponding to the selected visual experience. In accordance with this example, a parameter such as the color of the stationary region 604 may be identified for presentation that corresponds to the visual experience.

Block 1086, the remote client device 102 generates presentation parameters for the visual experience. In one example, the remote client device 102 randomly identifies the presentation parameters by randomly selecting one or more presentation parameters (e.g., responsive to a software or hardware random number generator) for the rotating marker 602. In accordance with this example, the remote client device 102 may randomly select one or more of an angular direction, direction of rotation, speed of rotation, color(s) of the region(s), or pattern(s) of the region(s) for the rotating marker 602.

Block 1088, the remote client device 102 presents the rotating marker with the generated presentation parameter for image capture by the viewing electronic devices. In one example, the remote client device 102 presents the rotating maker 602 with parameters corresponding to the generated presentation parameters (block 1086). Blocks 1086 and 1088 may be continuously repeated for the duration of the visual experience to change the rotating marker 602 being viewed by the viewing electronic device(s) 102 and, thus, influencing the visual experience on the display of the viewing electronic device(s) 102

Machine Architecture

Figure 11:
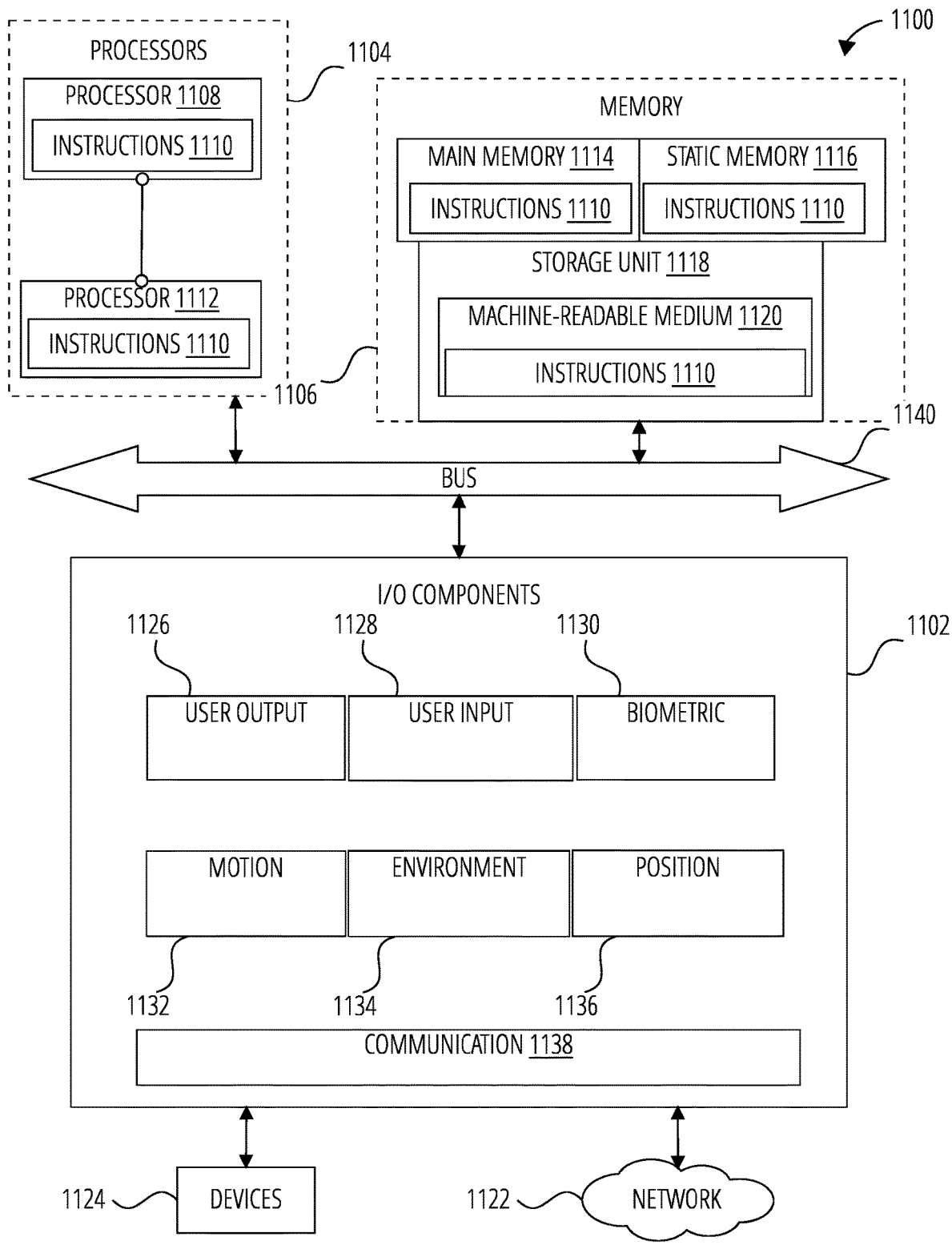
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the electronic device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the electronic device 102 may have a camera system comprising, for example, front cameras on a front surface of the electronic device 102 and rear cameras on a rear surface of the electronic device 102. The front cameras may, for example, be used to capture still images and video of a user of the electronic device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the electronic device 102 may also include a 360° camera for capturing 360° photographs and videos.

Further, the camera system of an electronic device 102 may include dual rear cameras (e.g., a primary camera as well as a depth-sensing camera), or even triple, quad or penta rear camera configurations on the front and rear sides of the electronic device 102. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Software Architecture

Figure 12:
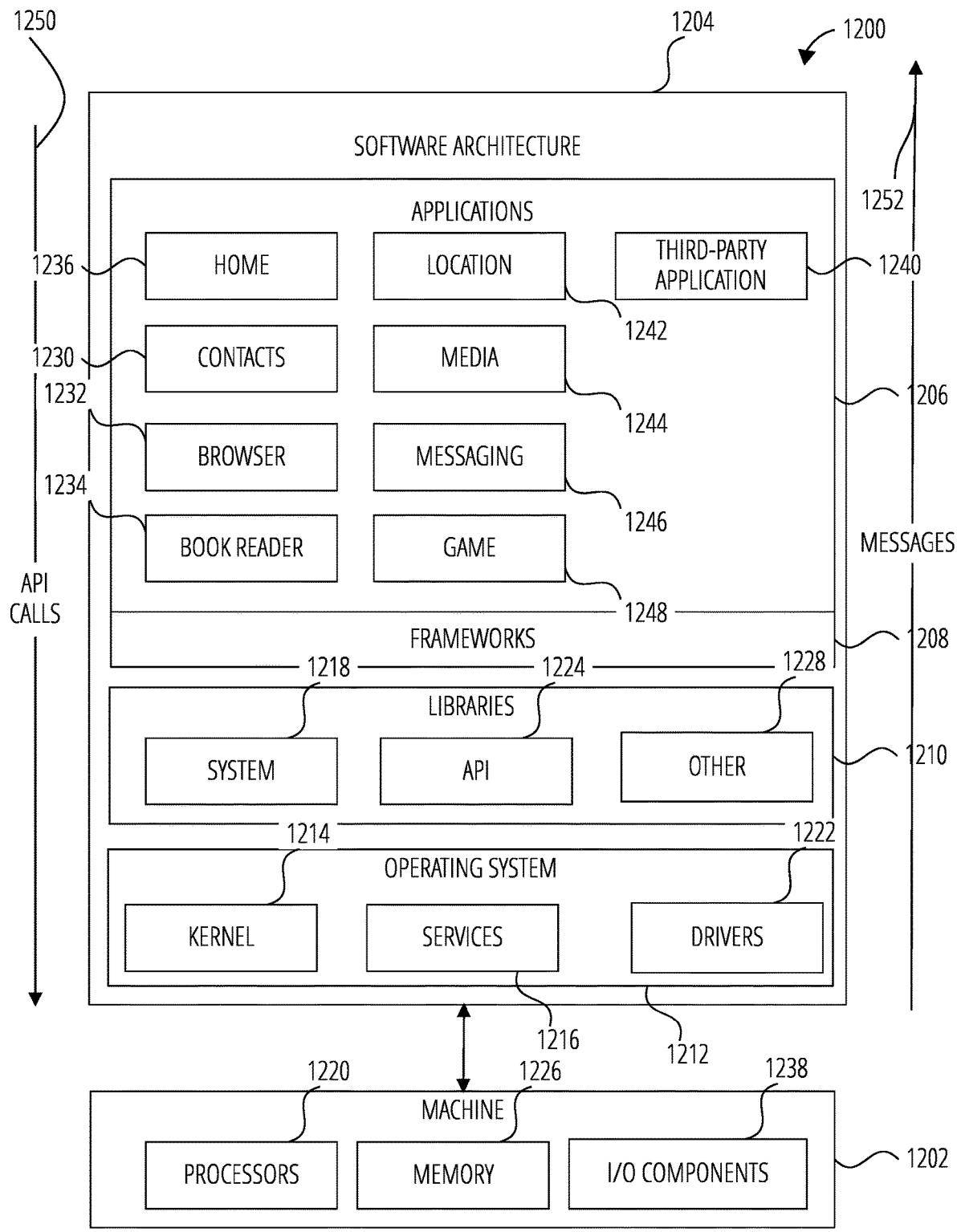
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a visual experience 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Processing Components

Figure 13:
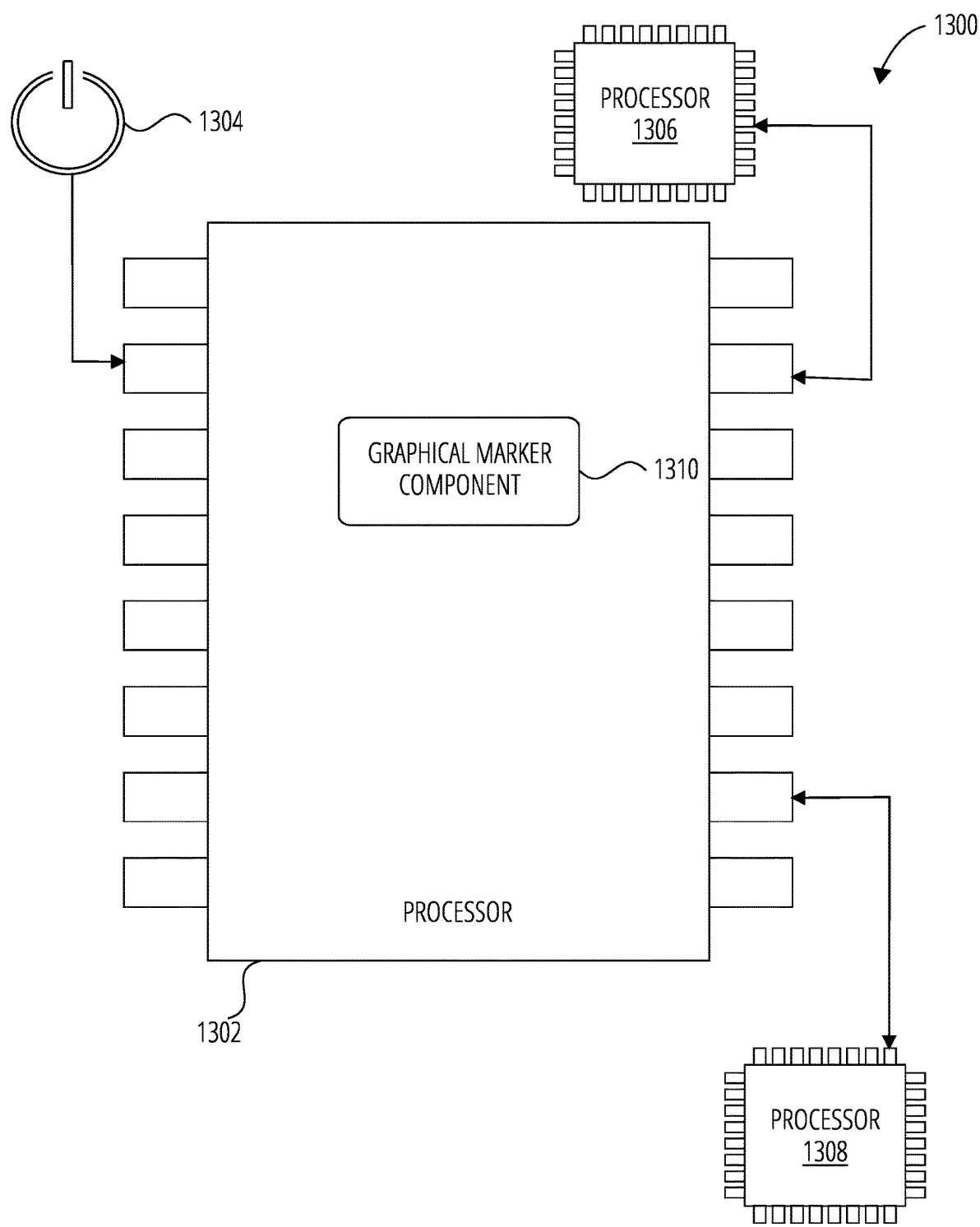
FIG. 13 is a diagrammatic representation of a processing environment, in accordance with some examples.

Turning now to FIG. 13, there is shown a diagrammatic representation of a processing environment 1300, which includes a processor 1302, a processor 1306, and a processor 1308 (e.g., a GPU, CPU, or combination thereof).

The processor 1302 is shown to be coupled to a power source 1304, and to include (either permanently configured or temporarily instantiated) modules, namely a rotating marker component 1310. The rotating marker component 1310 on a remote client device operationally generates a rotating marker. The rotating marker component 1310 on a viewing client device causes a viewing experience responsive to the rotating marker to be displayed on a display interface of a first viewing electronic device and a second viewing electronic device. The rotating marker component 1310 on the viewing client device(s) identifies a viewing experience, presents the viewing experience on a display of the respective viewing client device, detects parameters of the rotating marker from images captured by the respective viewing client device, and updates the viewing experience in response to the detected parameters. As illustrated, the processor 1302 is communicatively coupled to both the processor 1306 and the processor 1308.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
capturing images of a rotating marker with a camera of a viewing electronic device, the rotating marker presented on a video screen of a remote device;
presenting a visual experience on a display of the viewing electronic device, the visual experience having an adjustable feature;
detecting a parameter of the rotating marker at the viewing electronic device, the parameter corresponding to the adjustable feature; and
updating the visual experience presented on the display responsive to the detected parameter.

2. The method of claim 1, further comprising:
capturing images of the rotating marker with another camera of another viewing electronic device during the capture of the images of the rotating marker with the camera of the viewing electronic device;
presenting the visual experience on another display of the other viewing electronic device;
detecting the parameter of the rotating marker at the other viewing electronic device at the same time as at the viewing electronic device; and
updating the visual experience presented on the other display responsive to the detected parameter.

3. The method of claim 1, wherein the rotating marker comprises a region rotating around a rotational axis of the rotating marker and wherein the parameter is a rotation angle of the region with respect to a fixed direction extending from the rotational axis, a speed at which the region rotates around the rotational axis, or a direction in which the region rotates around the rotational axis.

4. The method of claim 3, wherein the visual experience is an interactive game including a first game piece responsive to the rotating marker and a second game piece, the adjustable feature includes a target state for the first game piece corresponding to one direction of rotation and an avoidance state for the first game piece corresponding to another direction of rotation, and the method further comprises:
   identifying movement of the viewing electronic device;
   further updating the visual experience by positioning the second game piece responsive to the identified movement; and
   scoring an interaction between the first game piece and the second game piece responsive to whether the adjustable feature is in the first state or the second state.

5. The method of claim 3, wherein the visual experience is an interactive game including a first game piece and a plurality of selectable targets responsive to the rotating marker, the adjustable feature includes a selection state for one or more of the plurality of selectable targets corresponding to the direction of rotation and the rotation angle, and the method further comprises:
   detecting input on the display of the viewing electronic device on or adjacent one of the plurality of selectable targets; and
   scoring the detected input responsive to the selection state of the one of the plurality of selectable targets.

6. The method of claim 3, wherein the visual experience is artistic visual media, the adjustable feature includes a radiating image corresponding to the speed of rotation, and the method comprises:
   determining the speed of rotation; and
   further updating the visual experience by changing the radiating image responsive to the determined speed of rotation.

7. The method of claim 1, further comprising:
   detecting another parameter of the rotating marker at the viewing electronic device, the other parameter corresponding to the visual experience; and
   selecting the visual experience to present from one of a plurality of visual experiences responsive to the detected other parameter.

8. The method of claim 1, wherein the captured images further include a visual experience identifier and the method further comprises:
   detecting the visual experience identifier in the captured images;
   selecting the visual experience to present from one of a plurality of visual experiences responsive to the detected visual experience.

9. The method of claim 1, wherein the marker comprises a first circle having a first radius and a second circle having a second radius that is smaller than the first circle, wherein the second circle is adjacent a perimeter of the first circle.

10. A system comprising:
    a viewing electronic device including:
      a camera configured to capture images;
      a display; and
      a processor coupled to the camera and the display, the processor configured to:
        capture, with the camera, images of a rotating marker, the rotating marker presented on a video screen of a remote device;
        present, on the display, a visual experience on a display of the viewing electronic device, the visual experience having an adjustable feature;
        detect a parameter of the rotating marker from the images captured with the camera at the viewing electronic device, the parameter corresponding to the adjustable feature; and
        update, on the display, the visual experience responsive to the detected parameter.

11. The system of claim 10, further comprising:
    another viewing electronic device including:
      another camera configured to capture images;
      another display; and
      another processor coupled to the other camera and the other display, the other processor configured to:
        capture images of the rotating marker with the other camera during the capture of images of the rotating marker with the camera of the viewing electronic device;
        present the visual experience on the other display;
        detect the parameter of the rotating marker from the images captured with the other camera at the other viewing electronic device at the same time as at the viewing electronic device; and
        update the visual experience presented on the other display responsive to the detected parameter.

12. The system of claim 10, wherein the rotating marker comprises a region rotating around a rotational axis of the rotating marker and wherein the parameter is a rotation angle of the region with respect to a fixed direction extending from the rotational axis, a speed at which the region rotates around the rotational axis, or a direction in which the region rotates around the rotational axis.

13. The system of claim 12, wherein the visual experience is an interactive game including a first game piece responsive to the rotating marker and a second game piece, the adjustable feature includes a target state for the first game piece corresponding to one direction of rotation and an avoidance state for the first game piece corresponding to another direction of rotation, and the processor is further configured to:
    identify movement of the viewing electronic device;
    further update the visual experience by positioning the second game piece responsive to the identified movement; and
    score an interaction between the first game piece and the second game piece responsive to whether the adjustable feature is in the first state or the second state.

14. The system of claim 12, wherein the visual experience is an interactive game including a first game piece and a plurality of selectable targets responsive to the rotating marker, the adjustable feature includes a selection state for one or more of the plurality of selectable targets corresponding to the direction of rotation and the rotation angle, the display is a touchscreen display, and the processor is further configured to:
    detect input on the touchscreen display of the viewing electronic device on or adjacent one of the plurality of selectable targets; and
    score the detected input responsive to the selection state of the one of the plurality of selectable targets.

15. The system of claim 12, wherein the visual experience is artistic visual media, the adjustable feature includes a radiating image corresponding to the speed of rotation, and the processor is further configured to:

determine the speed of rotation; and further update the visual experience by changing the radiating image responsive to the determined speed of rotation.

16. The system of claim 10, wherein the processor is further configured to:

detect another parameter of the rotating marker at the viewing electronic device, the other parameter corresponding to the visual experience; and select the visual experience to present from one of a plurality of visual experiences responsive to the detected other parameter.

17. The system of claim 10, wherein the captured images further include a visual experience identifier and the processor is further configured to:

detect the visual experience identifier in the captured images;

select the visual experience to present from one of a plurality of visual experiences responsive to the detected visual experience.

18. The system of claim 10, wherein the marker comprises a first circle having a first radius and a second circle having a second radius that is smaller than the first circle, wherein the second circle is adjacent a perimeter of the first circle.

19. A non-transient computer readable medium including instructions that, when executed by a processor of a system, configure the system to:

capture images of a rotating marker with a camera of a viewing electronic device, the rotating marker presented on a video screen of a remote device;

present a visual experience on a display of the viewing electronic device the visual experience having an adjustable feature;

detect a parameter of the rotating marker at the viewing electronic device, the parameter corresponding to the adjustable feature; and update the visual experience presented on the display responsive to the detected parameter.

20. The non-transient computer readable medium of claim 19, wherein the visual experience is an interactive game including a first game piece responsive to the rotating marker and a second game piece, the adjustable feature includes a target state for the first game piece corresponding to one direction of rotation and an avoidance state for the first game piece corresponding to another direction of rotation, and the instructions, when executed by the processor of the system, further configure the system to:

identify movement of the viewing electronic device;

further update the visual experience by positioning the second game piece responsive to the identified movement; and score an interaction between the first game piece and the second game piece responsive to whether the adjustable feature is in the first state or the second state.

* * * * *